United States Patent
Uemura

(10) Patent No.: US 12,454,215 B2
(45) Date of Patent: Oct. 28, 2025

(54) DATA PROCESSING DEVICE AND DATA PROCESSING METHOD

(71) Applicant: Faurecia Clarion Electronics Co., Ltd., Saitama (JP)

(72) Inventor: Takahiro Uemura, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 117 days.

(21) Appl. No.: 18/490,076

(22) Filed: Oct. 19, 2023

(65) Prior Publication Data

US 2024/0190338 A1  Jun. 13, 2024

(30) Foreign Application Priority Data

Dec. 9, 2022  (JP) .................................. 2022-197243

(51) Int. Cl.
| | |
|---|---|
| *B60Q 3/16* | (2017.01) |
| *B60Q 3/70* | (2017.01) |
| *G06F 3/16* | (2006.01) |
| *G06V 20/58* | (2022.01) |
| *G06V 20/59* | (2022.01) |
| *G06V 40/10* | (2022.01) |
| *G06V 40/20* | (2022.01) |

(52) U.S. Cl.
CPC ................ *B60Q 3/16* (2017.02); *B60Q 3/70* (2017.02); *G06F 3/167* (2013.01); *G06V 20/58* (2022.01); *G06V 20/59* (2022.01); *G06V 40/10* (2022.01); *G06V 40/28* (2022.01)

(58) Field of Classification Search
CPC . B60Q 3/16; B60Q 3/70; G06V 20/59; G06V 20/58; G06V 40/10; G06V 40/28; G06F 3/167
USPC .......................................................... 340/438
See application file for complete search history.

(56) References Cited

U.S. PATENT DOCUMENTS

| | | | |
|---|---|---|---|
| 2013/0030811 A1* | 1/2013 | Olleon .................... | G06F 3/011 348/148 |
| 2018/0241970 A1* | 8/2018 | Nakai .................... | G08G 1/166 |
| 2021/0382560 A1* | 12/2021 | Barth ...................... | G06F 3/017 |

(Continued)

FOREIGN PATENT DOCUMENTS

JP  2007-080060 A  3/2007

*Primary Examiner* — Kerri L McNally
(74) *Attorney, Agent, or Firm* — Volpe Koenig

(57) ABSTRACT

The disclosed data processing device installed in a vehicle includes an occupant state recognition unit that recognizes the action of an occupant of a vehicle pointing outside the vehicle, a peripheral circumstances acquisition unit that acquires the peripheral circumstances around the vehicle, an object recognition unit that recognizes the object pointed at by the occupant based on the recognition results obtained by the occupant state recognition unit and the acquisition results obtained by the peripheral circumstances acquisition unit, a relative direction determination unit that determines the relative direction of the object with respect to the vehicle, and a light control unit that controls the light emission appearance of an oblong shaped light-emitting unit installed above or below the windshield of the vehicle. The light control unit controls the light-emitting appearance such that the relative direction is identifiable based on the recognition results of the object recognition unit.

10 Claims, 4 Drawing Sheets

(56) References Cited

U.S. PATENT DOCUMENTS

2023/0114415 A1\* 4/2023 Livne .................... B60W 40/09
701/410

\* cited by examiner

FIG. 4

| Start condition | Finger pointing recognition |
| --- | --- |
| | Voice recognition of words registered in advance |
| End condition | Certain period of time has elapsed since the time of recognition of the object |
| | Certain period of time has elapsed since ceasing to make the finger pointing gesture |
| | Relative direction is behind vehicle |
| | End of use of object recognition results |
| Purpose | Providing object information |
| | Spot registration, Destination setting |
| | Automatic control, Automatic parking |

# DATA PROCESSING DEVICE AND DATA PROCESSING METHOD

FIELD OF THE INVENTION

The present invention relates to a data processing device and a data processing method.

BACKGROUND ART

Conventionally, a technology has existed for identifying target objects pointed at by a user who is the occupant of a vehicle. For example, Patent Document 1 states that "a target object identifying device that accurately identifies a target object that exists in the direction to which a user's hand or finger is pointing is provided," in addition to also stating that "Positioning unit 13 detects the current vehicle position and vehicle orientation. An imaging unit 18 images the surroundings of the vehicle. A pointing direction detection unit 16 detects the pointing direction indicated by the user in the vehicle using their hand. A target object extraction unit extracts target objects that exist in the pointing direction detected by the pointing direction detection unit 16 from the image captured by the imaging unit 18. The target object position identification unit identifies the position of the target object extracted by the target object extraction unit with respect to the vehicle."

PRIOR ART DOCUMENTS

Patent Document 1—JP2007080060 A

SUMMARY OF THE INVENTION

Problem to be Solved by the Invention

Conventional technology does not describe feedback as to how an in-vehicle device recognizes a finger pointing gesture by an occupant of a vehicle. For example, when a driver points at an object through the windshield, it is desirable for an in-vehicle device to establish an interaction that conveys the recognition of a pointed direction or recognition of a pointed object to the driver as feedback. This feedback must be carried out without impeding the driver's visual confirmation of their surroundings.

The object of the present invention is to provide a data processing device and a data processing method for providing suitable feedback to an occupant of a vehicle.

Means for Solving the Problem

In order to achieve the abovementioned object, one typical data processing device of the present invention includes a data processing device installed in a vehicle. The data processing device includes:
 an occupant state recognition unit that recognizes the action of an occupant of the vehicle pointing outside the vehicle; a peripheral circumstances acquisition unit that acquires the peripheral circumstances around the vehicle;
 an object recognition unit that recognizes an object pointed at by the occupant based on the recognition results obtained by the occupant state recognition unit and the acquisition results obtained by the peripheral circumstances acquisition unit;
 a relative direction determination unit that determines the relative direction of the object with respect to the vehicle; and
 a light control unit that controls the light emission appearance of an oblong shaped light-emitting unit installed above or below the windshield of the vehicle in the width direction of the vehicle body. The light control unit is configured so as to control the light-emitting appearance such that the relative direction is identifiable based on the recognition results from the object recognition unit, and when the relative direction changes as the vehicle moves, to change the light-emitting appearance in accordance with the change in the relative direction.

Effect of the Invention

The present invention can provide suitable feedback to an occupant of a vehicle. The following description of the embodiments will elucidate the problems, configurations, and effects other than those described above.

BRIEF DESCRIPTION OF THE DRAWINGS

FIG. 4 is an explanatory diagram of the control of a light-emitting appearance.

EMBODIMENTS OF THE INVENTION

Next, examples of the present invention will be described using the drawings.

Example 1

Figure 1:
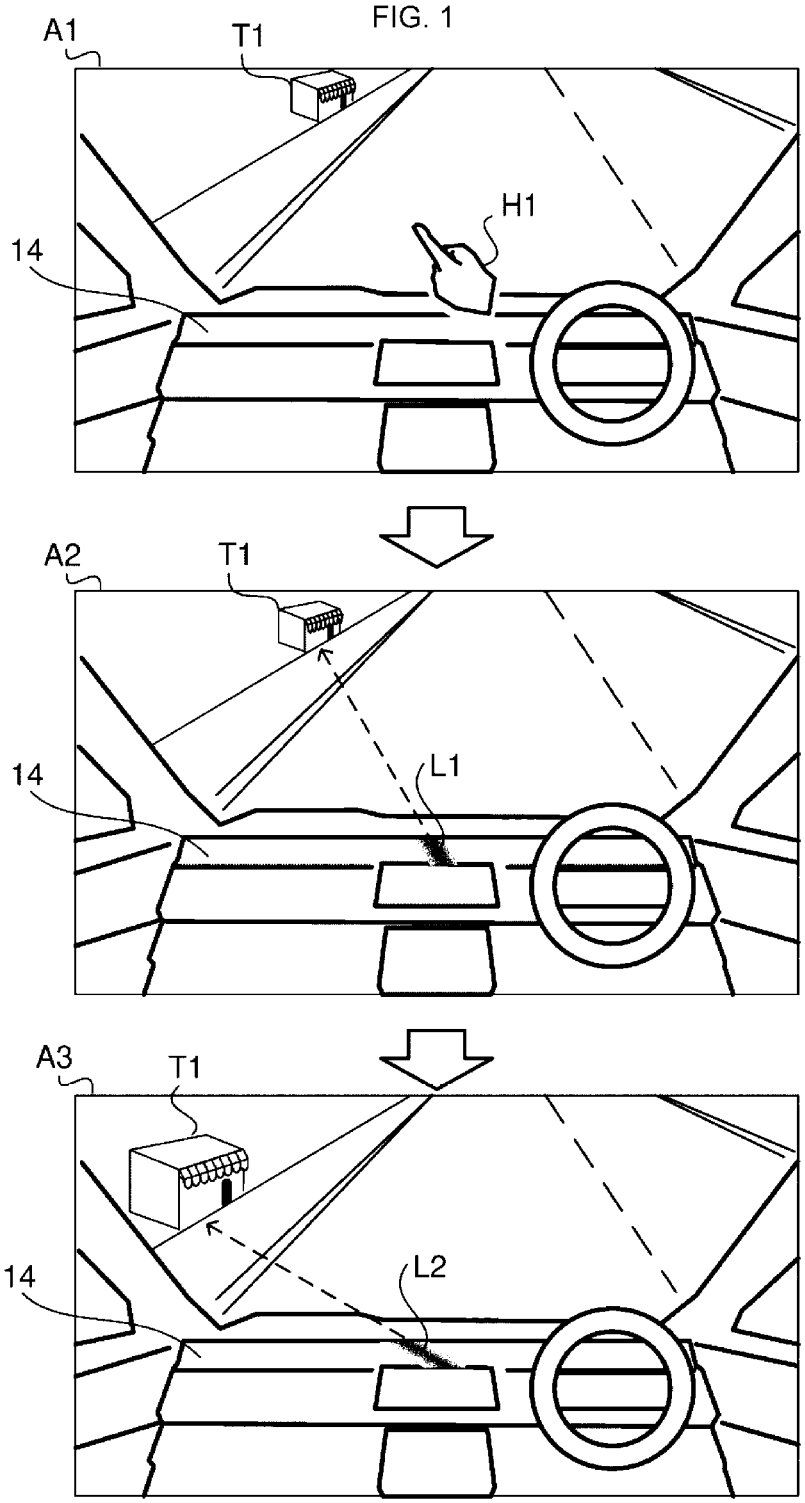
FIG. 1 is an explanatory diagram describing an overview of the operation and action of data processing of Example 1.
Figure 2:
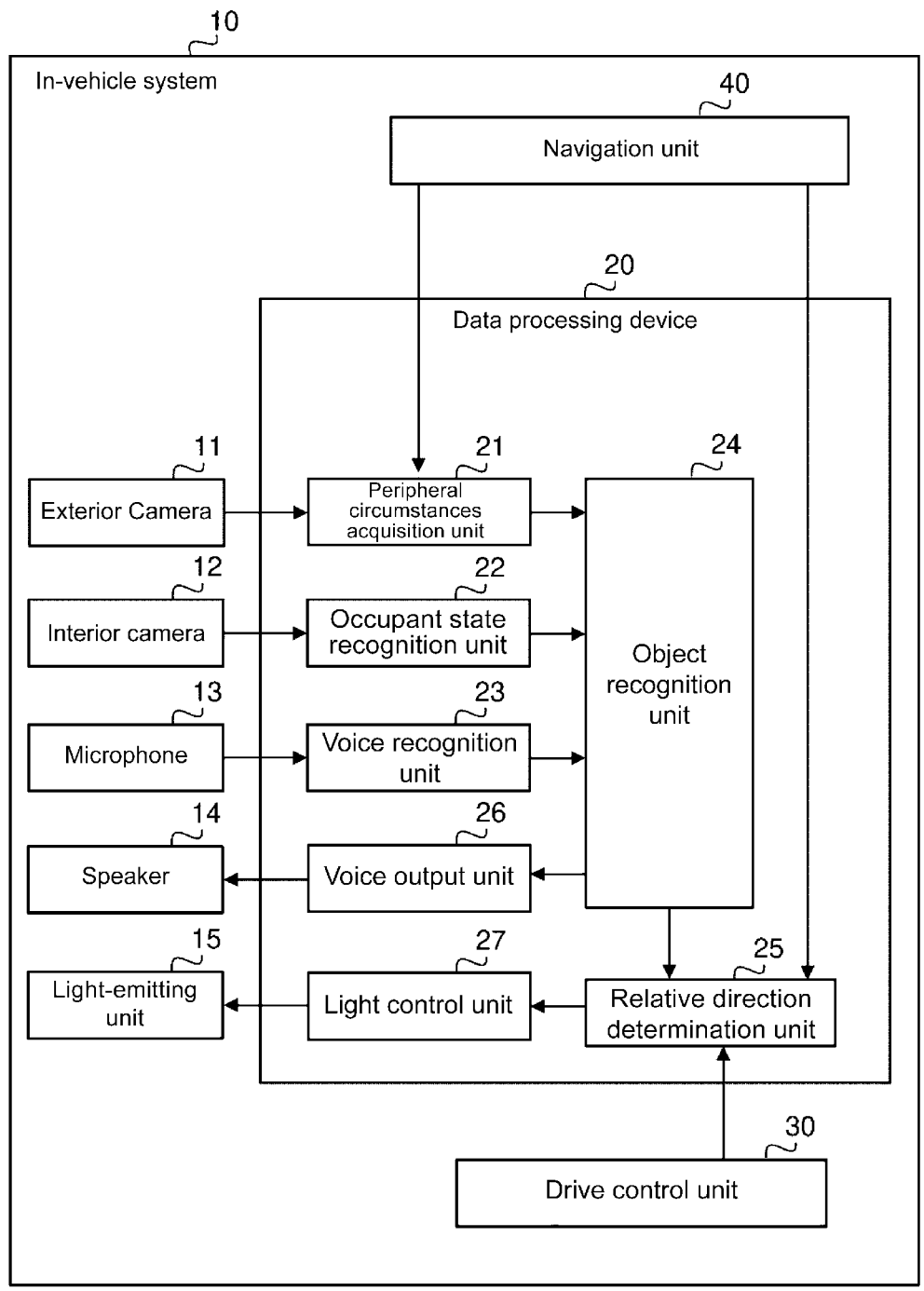
FIG. 2 is a configuration diagram of an overall in-vehicle system including the data processing device of Example 1.

FIG. 1 is an explanatory diagram describing an overview of the operation and action of data processing of Example 1. Furthermore, FIG. 2 is a configuration diagram of an overall in-vehicle system 10 including the data processing device 20 of Example 1. The in-vehicle system 10 provided in the vehicle is equipped with a data processing device 20, an interior camera 12 that captures images of the interior of the vehicle, and an exterior camera 11 that captures images of the surroundings of the host vehicle. The in-vehicle system 10 includes an oblong shaped light-emitting unit 15 installed below the windshield of the vehicle in the width direction of the vehicle body. The light-emitting unit 15 includes, for example, a light-emitting device (hereinafter, referred to as "low-resolution LEDs") arranged with multiple LEDs (light emitting diodes) in the width direction of the vehicle body and configured so as to emit light from a portion of the LEDs at a sufficiently low resolution to be recognized even in the peripheral visual field of the occupant.

The data processing device 20 acquires an image from the interior camera 12 and recognizes the state of the vehicle occupant who is the user from the image. For example, when the occupant points outside the vehicle, the data processing device 20 analyzes the images of the interior camera 12 in order to identify the eye position and hand finger position of the occupant and determines that a straight line connecting the eye position and fingertip is the pointing direction. Herein, the term "hand finger" is used to include at least one of a hand and a finger.

The data processing device 20 acquires the peripheral circumstances around the vehicle from the output of the exterior camera 11. The exterior camera 11 is, for example, a stereo camera, and the data processing device 20 can acquire a spatial map that is three-dimensional map data of the surroundings of the vehicle. LiDAR (light detection and ranging) may be used instead of a stereo camera or, alternatively, the stereo camera and LIDAR may be used in combination.

The data processing device 20 recognizes the object pointed at by the occupant as the pointing object by using the pointing direction and the space map. The data processing device 20 determines the relative direction with regard to the pointing target and the host vehicle. The data processing device 20 causes the light-emitting unit 15 to emit light in a light-emitting appearance indicating the relative direction. The data processing device 20 continues light control indicating the relative direction even after the occupant ceases to make the finger pointing gesture. When the relative direction changes as the vehicle moves, the data processing device 20 changes the light-emitting appearance in accordance with the change in the relative direction.

In FIG. 1, the data processing device 20 determines the finger pointing gesture by the hand H1 of the occupant (A1). The data processing device 20 recognizes a store T1 as a pointing object, then causes the light-emitting unit 15 to display a display T1 indicating the relative direction of the store L1 (A2). The data processing device 20 continues to display the relative direction even when the occupant ceases to make the finger pointing gesture. When the relative direction changes as the vehicle moves, the data processing device 20 changes the display L2 following the change in the relative direction (A3).

The data processing device 20 provides feedback on the recognition results of the pointing action by the occupant by indicating the relative direction. Since the data processing device 20 continues emitting light while following the change in the relative direction, it is possible to notify the occupant of the recognition results in an easily understandable manner. Since the data processing device 20 indicates the recognition results as a change in the light-emitting appearance below the windshield, the occupant can check the feedback from the data processing device 20 in the peripheral vision field while directly viewing the surroundings of the vehicle.

In FIG. 2, the data processing device 20 is connected to a drive control unit 30 and a navigation unit 40. The drive control unit 30 is a unit that controls the acceleration/deceleration and steering of the host vehicle. The navigation unit 40 of the vehicle is a unit that identifies the position of the host vehicle, references the map database, and searches for and guides the route of the vehicle. The map database is used as a target object database indicating the position of objects that may be pointed at by the occupant.

The data processing device 20 is connected to an exterior camera 11, an interior camera 12, a microphone 13, a speaker 14, and a light-emitting unit 15 of the in-vehicle system 10. The exterior camera 11 is an imaging device that captures the surroundings of the vehicle. The interior camera 12 is an imaging device that captures images of the vehicle interior and functions as a sensor to acquire the status of the occupant in the vehicle cabin. The microphone 13 collects sound in the cabin. The speaker 14 is installed in the vehicle cabin and provides voice output to the occupant. The light-emitting unit 15 is an oblong shaped low-resolution LED installed below the windshield of the vehicle in the width direction of the vehicle body.

The exterior camera 11 is installed at a position such that, for example, the field of view of the occupant is included in the imaging range.

The interior camera 12 is installed at a position such that the eyes and hands of the occupant can be imaged, for example, near the rear-view mirror or an interior light, or the like.

The data processing device 20 has a peripheral circumstances acquisition unit 21, an occupant state recognition unit 22, a voice recognition unit 23, an object recognition unit 24, a relative direction determination unit 25, a voice output unit 26, and a light control unit 27. When the data processing device 20 is implemented using a computer, the CPU (central processing unit) executes a program to implement the functions corresponding to the peripheral circumstances acquisition unit 21, the occupant state recognition unit 22, the voice recognition unit 23, the object recognition unit 24, the relative direction determination unit 25, the voice output unit 26, and the light control unit 27.

The peripheral circumstances acquisition unit 21 acquires the peripheral circumstances around the vehicle. The peripheral circumstances acquisition unit 21 acquires a space map from the imaging results of the exterior camera 11 that captures images of the surroundings of the host vehicle. The peripheral circumstances acquisition unit 21 acquires the position data of the host vehicle specified by the navigation unit 40 and the map data of the surroundings.

The occupant state recognition unit 22 acquires images captured by the interior camera 12 and recognizes the state of the vehicle occupant. The occupant state recognized by the occupant state recognition unit 22 includes motions of pointing outside the vehicle. The occupant state recognition unit 22 recognizes the position of the occupant's eyes and the occupant's hand and fingers. The occupant state recognition unit 22 recognizes the pointing direction from the position of the occupant's eyes and the position of the finger, then outputs the pointing direction to the object recognition unit 24.

The voice recognition unit 23 recognizes the utterances of the occupant from the vocal sounds collected by the microphone 13 installed in the vehicle. The voice recognition unit 23 may recognize words uttered along with an action indicated by the occupant, such as "What is that?"

The object recognition unit 24 recognizes the object pointed at by the occupant using the surrounding circumstances and the pointing direction. The object recognition unit 24 superimposes the pointing direction on the space map, then recognizes an object on the space map located in the pointing direction as the object indicated by the occupant. The timing at which the object recognition unit 24 recognizes the object may be the timing at which the occupant state recognition unit 22 recognizes the finger pointing or the timing at which the voice recognition unit 23 recognizes a predetermined utterance.

The relative direction determination unit 25 determines the relative direction of the object recognized by the object recognition unit 24 with respect to the vehicle. The relative direction determination unit 25 uses the position of the object recognized by the object recognition unit 24 on the spatial map in order to determine the relative direction. The relative direction determination unit 25 can use the position data of the host vehicle specified by the navigation unit 40 and the map data of the surroundings in order to determine the relative direction. The relative direction determination unit 25 uses data regarding the speed and the steering state of the host vehicle acquired from the drive control unit 30 in order to determine the relative direction. When the vehicle moves after the object is recognized, the relative direction determination unit 25 changes the relative direction in accordance with the movement.

The voice output unit 26 outputs voice signals from the speaker 14. The voice output unit 26 outputs a predetermined voice signal from the speaker 14 based on the recognition results of the object recognition unit 24.

The light control unit 27 controls the light-emitting appearance of the light-emitting unit 15. The light control unit 27 controls the light-emitting appearance of the light-emitting unit 15 such that the relative direction is identifiable based on the recognition results of the object recognition unit 24, and when the relative direction changes as the vehicle moves, changes the light-emitting appearance of the light-emitting unit 15 in accordance with the change in the relative direction.
The light control unit 27 causes the light-emitting unit 15 to stop emitting light when a predetermined end condition is satisfied. As the end condition, "a certain period of time has elapsed since the time of recognition of the object by the object recognition unit 24," "when the relative direction is behind the vehicle," or the like is applicable.

Figure 3:
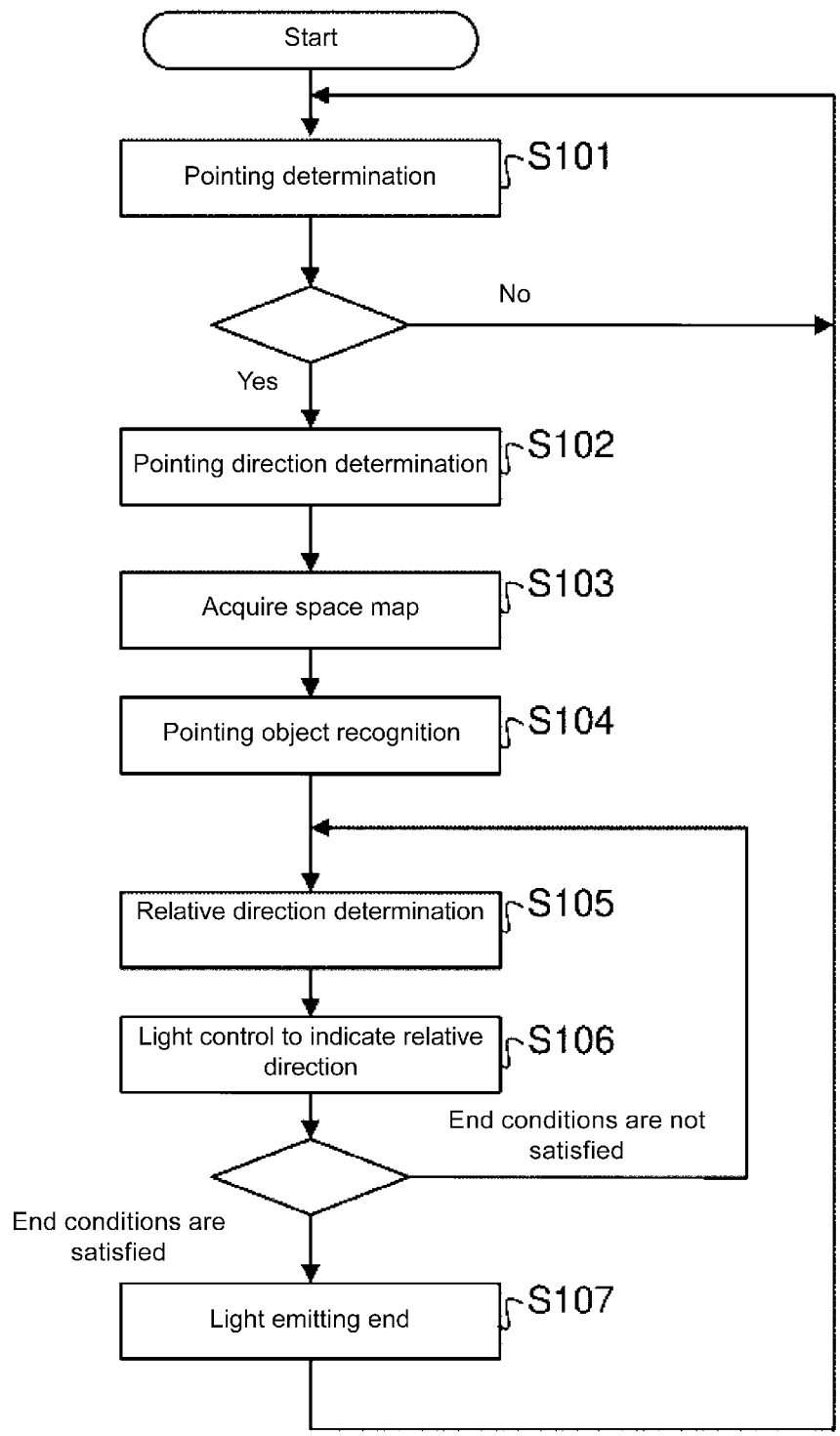
FIG. 3 is a flowchart describing light control.

FIG. 3 is a flowchart depicting the processing steps of the data processing device 20. The data processing device 20 repeatedly executes the processes of steps S101 to S107 illustrated in FIG. 3.

Step S101 (an occupant state recognition step): the occupant state recognition unit 22 recognizes the occupant state based on photographed results of the interior camera 12 and determines whether or not the occupant is making a finger pointing gesture. When the occupant state recognition unit 22 determines that the occupant is not making a finger pointing gesture, the occupant state recognition unit 22 repeats step S101. When the occupant state recognition unit 22 determines that the occupant is making a finger pointing gesture, the occupant state recognition unit 22 proceeds to step S102.

Step S102 (occupant state recognition step): the occupant state recognition unit 22 determines the pointing direction and proceeds to step S103.

Step S103 (peripheral circumstances acquisition step): the peripheral circumstances acquisition unit 21 acquires the space map from the imaging results of the exterior camera 11 and proceeds to step S104.

Step S104 (object recognition step): the object recognition unit 24 recognizes the object pointed at by the occupant using the space map and the indication direction and proceeds to step S105.

Step S105 (relative direction determination step): the relative direction determination unit 25 determines the relative direction of the object recognized by the object recognition unit 24 with respect to the vehicle and proceeds to step S106.

Step S106 (light control step): the light control unit 27 carries out light control on the light-emitting unit 15 for indicating the relative direction, while determining whether or not the light-emitting end condition is satisfied. If the end condition is not satisfied, the process returns to step S105. If the end condition is satisfied, the process proceeds to step S107.

Step S107: the light control unit 27 stops the emission of light by the light-emitting unit 15, then the process returns to step S101.

FIG. 4 is an explanatory diagram of the control of the light-emitting appearance.

As a start condition of object recognition, "finger pointing recognition" and "voice recognition of words registered in advance" can be used.

As an end condition of the control of the light-emitting appearance, "a certain period of time has elapsed since the time of recognition of the object," "a certain period of time has elapsed since end of ceasing to make the finger pointing gesture," "the relative direction is behind the vehicle," and "the end of use of the object recognition result" can be used. As the purpose of the object recognition result, "providing object information," "spot registration, destination setting," and "automatic control, automatic parking" can be used.

In "providing object information," the voice output unit 26 outputs the object information as a voice from the speaker 14. When the recognized object is a store, the voice output unit 26 outputs a voice indicating the name thereof, the type, the business hours, the event information, or the like from the speaker 14. These pieces of information may be predetermined voice information stored in advance as a voice signal or voice information appropriately converted from text information. The object information may be displayed on a separately provided display in addition to or instead of being output as a voice.

In "spot registration, destination setting," the object recognition unit 24 requests the navigation unit 40 to carry out spot registration and destination setting of the recognized object.

In "automatic control and automatic parking," the object recognition unit 24 requests the drive control unit 30 to control automatic traveling and automatic parking in which the location of the recognized object is set as the destination.

As mentioned above, the disclosed data processing device 20 installed in a vehicle includes an occupant state recognition unit 22 that recognizes the action of an occupant of a vehicle pointing outside the vehicle, a peripheral circumstances acquisition unit 21 that acquires the peripheral circumstances around the vehicle, an object recognition unit 24 that recognizes the object pointed at by the occupant based on the recognition results obtained by the occupant state recognition unit 22 and the acquisition results obtained by the peripheral circumstances acquisition unit 21, a relative direction determination unit 25 that determines the relative direction of the object with respect to the vehicle, and a light control unit 27 that controls the light emission appearance of an oblong shaped light-emitting unit 15 installed above or below the windshield of the vehicle in the width direction of the vehicle body. The light control unit 27 is configured so as to control the light-emitting appearance such that the relative direction is identifiable based on the recognition results of the object recognition unit 24, and when the relative direction changes as the vehicle moves, to change the light-emitting appearance in accordance with the change in the relative direction.
With this configuration and action, the data processing device 20 can provide suitable feedback to a vehicle occupant.

The disclosed data processing device 20 further includes the voice recognition unit 23 that recognizes utterances of the occupant from the vocal sounds collected by the microphone 13 installed in the vehicle. The object recognition unit 24 recognizes the object pointed at by the occupant at the timing when the voice recognition unit 23 recognizes predetermined utterances.

Therefore, the data processing device 20 can accurately grasp the intention of the occupant pointing towards the object and recognize the object.

The disclosed data processing device 20 further includes the voice output unit 26 that outputs a voice signal from the speaker 14 installed in the cabin of the vehicle. The voice output unit 26 outputs a predetermined voice signal from the speaker 14 based on the recognition results of the object recognition unit 24.

Consequently, the data processing device 20 can provide information regarding the recognition result to the occupant.

As an example, the light control unit 27 causes the light-emitting unit to stop emitting light after a certain period of time has elapsed since the time of recognition of the object.

As an example, the light control unit 27 causes the light-emitting unit to stop emitting light when the relative direction is behind the vehicle.

In this way, the data processing device 20 can appropriately stop the emission of light in accordance with the state.

As an example, the peripheral circumstances acquisition unit 21 generates a space map based on information acquired from LiDAR (light detection and ranging) and/or a stereo camera installed outside the vehicle.

Consequently, the data processing device 20 can accurately grasp the peripheral circumstances and recognize the object.

As an example, the light-emitting unit 15 is a low-resolution LED (light emitting diode).

Since feedback from the light-emitting unit 15 does not require the output of detailed information, a low-resolution LED is suitable. Low-resolution LEDs can also be used for the vehicle interior.

As the light-emitting unit 15, instead of such low-resolution LEDs, a high-resolution display device such as a liquid crystal display (LCD) or an organic EL display (OLED) may be used. In such a case, feedback is displayed at a lower resolution on all or a portion of the display. A projector may also be used that projects a light beam onto a portion of the vehicle interior, such as the dashboard, installed in the width direction of the vehicle body. A head-up display (HUD) that causes a portion of the windshield to emit light may also be used.

In any of the abovementioned forms of the light-emitting unit 15, since the light-emitting unit 15 emits light at a sufficiently low resolution to be recognized even in the peripheral visual field of the occupant, the occupant's line of sight is not focused on the light-emitting unit 15. The occupant can recognize the state of the light-emitting unit 15 while turning the occupant's line of sight to the front of a freon glass and paying attention to safety.

Note that the present invention is not limited to the abovementioned examples and includes various modified examples. For example, while the abovementioned examples have been described in detail in order to describe the present invention in an easy-to-understand manner, the present invention is not necessarily limited to those with all the described configurations. Moreover, not only the deletion of such configurations, but also the replacement or addition of configurations is possible.

For example, if there are other occupants besides the driver, the present invention may be applied to the other occupants. A specific occupant among the multiple occupants may also be designated as the occupant to whom the present invention is applied.

The status of the occupant may also be acquired from an arbitrary sensor other than an interior camera, such as LIDAR (light detection and ranging, laser imaging detection and ranging), a stationary smartphone, or the like. Furthermore, the outputs of a plurality of sensors and a plurality of types of sensors can be combined.

Furthermore, in the example described above, while a line extending from the eyes and fingertips was determined as the direction in which the occupant is pointing, it is also possible to recognize two points on the fingers and determine that a line extending between these two points is the direction in which the occupant is pointing.

DESCRIPTION OF REFERENCE NUMERALS

10. In-vehicle system, 11. Exterior camera, 12. Interior camera, 13. Microphone, 14. Speaker, 15. Light-emitting unit, 20. Data processing device, 21. Peripheral circumstances acquisition unit, 22. Occupant state recognition unit, 23. Voice recognition unit, 24. Object recognition unit, 25. Relative direction determination unit, 26. Voice output unit, 27. Light control unit, 30. Drive control unit, 40. Navigation unit

The invention claimed is:

1. A data processing device installed in a vehicle, comprising:
    an occupant state recognition unit that recognizes the action of an occupant of the vehicle pointing outside the vehicle;
    a peripheral circumstances acquisition unit that acquires the peripheral circumstances around the vehicle;
    an object recognition unit that recognizes the object pointed at by the occupant based on the recognition results obtained by the occupant state recognition unit and the acquisition results obtained by the peripheral circumstances acquisition unit;
    a relative direction determination unit that determines the relative direction of the object with respect to the vehicle; and
    a light control unit that controls the light emission appearance of an oblong shaped light-emitting unit installed above or below the windshield of the vehicle in the width direction of the vehicle body,
    wherein the light control unit is configured so as to control the light-emitting appearance such that the relative direction is identifiable based on the recognition results of the object recognition unit, and when the relative direction changes as the vehicle moves, to change the light-emitting appearance in accordance with the change in the relative direction.

2. The data processing device according to the claim 1, further comprising a voice recognition unit that recognizes utterances of the occupant from vocal sounds collected by a microphone installed in the vehicle,
    wherein the object recognition unit recognizes the object pointed at by the occupant at the timing when the voice recognition unit recognizes predetermined utterances.

3. The data processing device according to the claim 1, wherein the light control unit causes the light-emitting unit to stop emitting light after a certain period of time has elapsed since the time of recognition of the object.

4. The data processing device according to the claim 1, wherein the light control unit causes the light-emitting unit to stop emitting light when the relative direction is behind the vehicle.

5. The data processing device according to the claim 1, wherein the light-emitting appearance is an appearance in which a portion of the light-emitting unit is caused to emit light at a sufficiently low resolution to be recognized even in the peripheral visual field of the occupant.

6. A data processing method in a data processing device installed in a vehicle comprising an oblong shaped light-emitting unit installed above or below the windshield in the width direction of the vehicle body, comprising:

an occupant state recognition step that recognizes the action of an occupant of the vehicle pointing outside the vehicle;

a peripheral circumstances acquisition step that acquires the peripheral circumstances around the vehicle;

an object recognition unit step recognizes the object pointed at by the occupant based on the recognition results obtained by the occupant state recognition step and the acquisition results obtained by the peripheral circumstances acquisition step;

a relative direction determination step that determines the relative direction of the object with respect to the vehicle; and a light control step that controls the light-emitting appearance of the light-emitting unit such that the relative direction is identifiable based on the recognition results of the object recognition step, and when the relative direction changes as the vehicle moves, changes the light-emitting appearance in accordance with the change in the relative direction.

7. The data processing method according to the claim 6, further comprising a voice recognition step that recognizes utterances of the occupant from vocal sounds collected by a microphone installed in the vehicle, wherein the object recognition step recognizes the object at the timing when the voice recognition step recognizes predetermined utterances.

8. The data processing method according to the claim 6, wherein the light control step includes control to stop the emission of light by the light-emitting unit after a certain period of time has elapsed since the time of recognition of the object.

9. The data processing method according to the claim 6, wherein the light control step includes control to stop the emission of light by the light-emitting unit when the relative direction is behind the vehicle.

10. The data processing method according to the claim 6, wherein the light-emitting appearance is an appearance in which a portion of the light-emitting unit is caused to emit light at a sufficiently low resolution to be recognized even in the peripheral visual field of the occupant.

* * * * *